Figure 1:
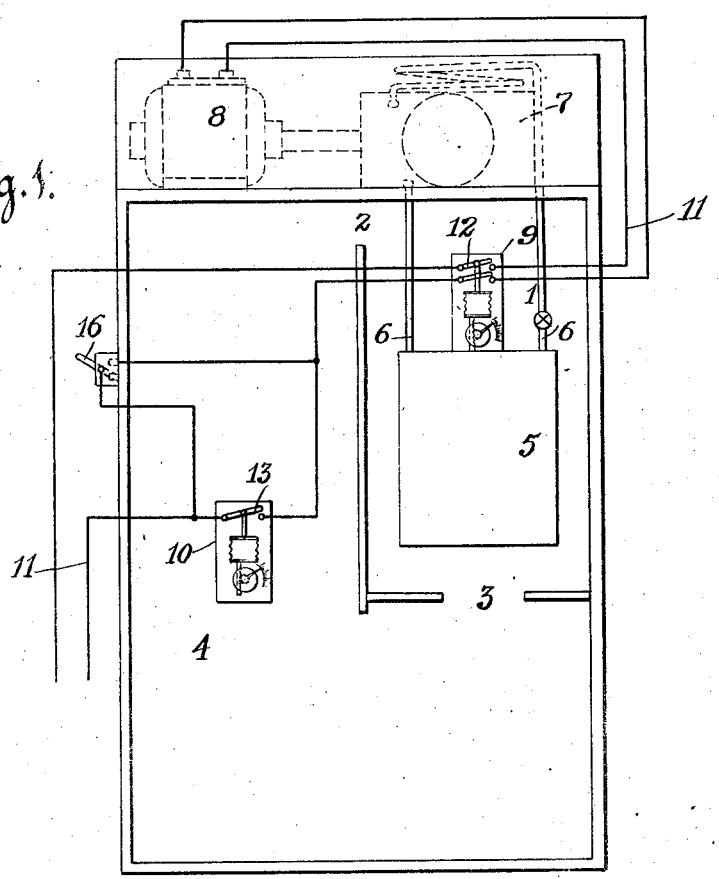

Jan. 19, 1926.  1,570,416

H. S. VASSAR

REFRIGERATION

Filed Dec. 18, 1924

INVENTOR
Hervey S. Vassar
BY
Philip S. McLean ATTORNEY

Patented Jan. 19, 1926.

1,570,416

UNITED STATES PATENT OFFICE.

HERVEY S. VASSAR, OF BLOOMFIELD, NEW JERSEY.

REFRIGERATION.

Application filed December 18, 1924. Serial No. 756,651.

*To all whom it may concern:*

Be it known that I, HERVEY S. VASSAR, a citizen of the United States, and a resident of Bloomfield, county of Essex, and State of New Jersey, have invented certain new and useful Improvements in Refrigeration, of which the following is a specification.

This invention relates particularly to smaller refrigerating systems of the domestic or household type where efficiency and economy of operation are prime requisites.

Some of the more important objects of the invention are to provide economical, efficient refrigeration, embodied in simple, practical apparatus, free of complication and having relatively low initial cost.

In the two types of apparatus so far developed it has been customary in one class of machines to control the refrigerating action from a thermostat associated with the cooling unit and in the second class of machines from a thermostat disposed in the food compartment or storage chamber. The first class of machines has a tendency to keep the cooling unit temperature constant irrespective of conditions in the storage compartment. This is desirable from the standpoint of maintaining a constant cooling effect, but has its faults, particularly in the case of a low surrounding temperature where, under conditions when no artificial refrigeration is necessary, such refrigeration is nevertheless supplied, resulting in a waste of energy and frequently the freezing of the contents of the storage chamber.

To offset this condition such extremes have been resorted to as to place an electric lamp in the storage compartment which can be turned on at such times to prevent freezing the contents. The second method of control also is wasteful, particularly under warm weather conditions, where, even after the brine tank or other cooling unit has been reduced to the minimum possible temperature, the machine may keep on running, with, of course, no useful result.

These and other faults of existing systems are overcome in the present invention, in large part through a combination of the two known forms of control and involving a conjoint regulation of the refrigerating unit by thermostatic controllers subjected one to conditions adjacent the cooling unit and the other to conditions in the storage chamber and whereby the action of both will be necessary to initiate refrigerating operations, but either will be effective to interrupt positive refrigeration when temperature conditions at either the cooling unit or in the storage chamber have been brought below the predetermined maximum at which the controllers have been set.

Various special novel features of the invention including a manual control for arbitrarily regulating the action independently of the automatic controllers, will appear as the specification proceeds.

In the drawing accompanying and forming part of this specification, an illustrative embodiment of the invention has been shown, but the structure may be modified in various ways without departure from the spirit and scope of the invention as will be apparent from the broad scope of the appended claims.

Figure 1 in the drawing referred to is a front elevation and part sectional view of a refrigerator having the invention applied to and incorporated therein with an example of the control circuits illustrated in diagrammatic fashion.

Figure 2:
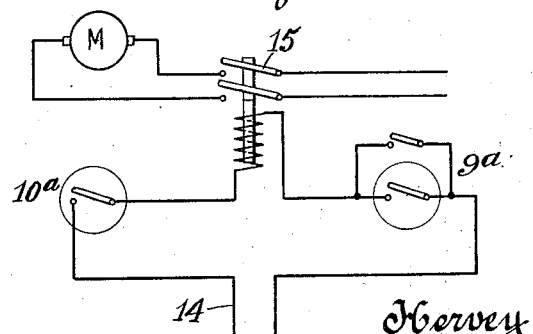

Figure 2 is a diagrammatic representation of a slightly modified form of the control system.

The refrigerator illustrated is of a more or less conventional form involving a chamber 1 for the refrigerant connected by passages 2, 3, at top and bottom with a food compartment or storage chamber 4.

The cooling unit is illustrated as a brine tank 5 or the like mounted in the refrigerating chamber and containing a refrigerant coil connected by suitable piping 6 with the compressor or refrigerating machine 7 driven by electric motor 8. The action of this machine is usually governed by starting and stopping the motor.

The two thermostats or devices by which the control is effected are designated 9 and 10, the first of these being located in the refrigerating chamber, on or closely adjacent the brine tank and the second located in the upper or intermediate portion of the storage chamber. In Figure 1 these two thermostats are shown as of the regulatable type and as controlling the motor and hence the operation of the refrigerating machine as a whole, by being included directly in series in the motor circuit through wiring 11 and thermostatically or pressure governed switches 12, 13.

In Figure 2 the same final result is attained by arranging the two thermostats 9ᵃ and 10ᵃ in series relation in a branch circuit 14 so as to conjointly control a relay switch 15 in the power circuit of the motor.

The thermostatic controls are preferably of the adjustable type so that they may be individually set to produce the desired individual as well as conjoint control. Thus for example, the refrigerant thermostat 9 may be set for a temperature at the refrigerating unit of 22 degrees F. and the storage chamber thermostat 10 may be adjusted for a temperature of 45–50 degrees F. in the upper or intermediate portion of the food chamber.

Under the conditions supposed, the refrigerating machine will be brought into operation through the conjoint control of the two thermostats when the temperature at the cooling unit rises above 22 degrees F. and the temperature in the upper or intermediate portion of the food chamber exceeds 50 degrees F. As soon, however, as the temperature at either of these places is reduced to the temperature for which the thermostat there has been set, the control circuit will be interrupted and the forced refrigeration stopped. Thus the refrigerating action ceases when the food compartment is properly chilled and similarly the action ceases when the refrigerating element has been brought to its lowest temperature. Therefore, as soon as the machine has exerted its maximum effect, that is, brought the cooling element down to the low temperature for which it is set, the machine will be automatically relieved of all further or futile effort. Thus if the storage compartment should be left open, the machine will be automatically stopped as soon as the cooling unit is brought down to its proper temperature and will not be kept running uselessly. With this dual or combination control the cooling element thermostat may be set for a lower temperature than would be practicable with the single control machines now in use, thereby assuring sufficient refrigeration under all conditions ordinarily encountered.

Under conditions of low ambient temperature when no artificial refrigeration may be required, the machine will remain idle, avoiding freezing of the food contents, waste of energy and other objections such as have heretofore followed the use of those systems in which the cooling element was maintained at a predetermined low temperature regardless of surrounding conditions. The independent adjustability of the two thermostatic controls enables the setting of the machine to best answer the requirements of variable refrigerating loads, seasonal or climatic conditions.

As there may be times when an arbitrary control over the machine is desirable, a master controller may be provided such as the manually operable switch indicated at 16 and shown connected in a short circuiting bridge about the cooling machine thermostat 10. This switch may be used to in effect "force" the machine for manufacture of "table ice" or the like.

The thermostatic devices may be of any approved or special construction, preferably adjustable to enable independent setting of the same to accomplish the best or most efficient results under various conditions. The storage compartment thermostat also preferably is either enclosed in such a way or constructed to introduce a slight "lag" in the action of the same so as not to be unduly affected by slight or inconsequential changes such as might be occasioned by opening the door to the compartment.

For convenience of disclosure the controls have been referred to herein as thermostats or thermostatic devices, but it should be understood that these terms are used in a broad and comprehensive sense as it will be clear that pressure operated or other than strictly "thermostat" controls may be used. Other terms employed herein likewise are used in a descriptive rather than in a limiting sense, except possibly for such limitations as may be imposed by the state of the prior art.

Extensive tests conducted with the best forms of apparatus now on the market show that these machines, so far as the maintenance of constant temperature in the storage chamber is concerned, are but little if any better than ordinary ice refrigeration. In other words, the temperature curves of the storage compartments in present-day machines follow quite consistently the ambient temperature curves so that the contents of the storage compartments are subjected to rising and falling temperature changes directly proportional to atmospheric changes. With this invention, however, the storage compartment temperature can be maintained at a substantially constant point irrespective of temperature changes in the ambient atmosphere. Operating curves taken from a machine equipped with the invention show a substantially constant storage temperature within the desired refrigerating range throughout a widely varying range in ambient temperature. This means that the contents of the storage chamber is by this invention, maintained at a substantially uniform temperature and this without any waste of energy such as has occured in systems heretofore in use.

What is claimed is:

1. In refrigerating apparatus of the character disclosed, the combination with a refrigerator structure having communicating cooling and storage compartments, a cooling unit within the cooling compartment, means for circulating a refrigerant through said cooling unit, of a thermostatic control ler located in the cooling compartment, a thermostatic controller located in the storage compartment and connections establishing said thermostatic controllers in series relation with each other and with said circulating means, enabling either of said controllers to stop the circulating means, independently of the other and requiring their joint cooperation to start the circulating means.

2. In refrigerating apparatus of the character disclosed, the combination with a refrigerator structure having communicating cooling and storage compartments, a cooling unit in the cooling compartment and means for circulating a refrigerant through said cooling unit, of an automatic thermostatic controller for said circulating means located in the cooling compartment and a second automatic thermostatic controller for said circulating means located in the storage compartment and connected in series relation with the first thermostatic controller and with said circulating means for requiring joint operation of the automatic controllers to start the circulating means and enabling either automatic controller effective to stop the circulating means independently of the other.

3. The combination with a refrigerant system including a cooling unit and means for circulating a refrigerant through said cooling unit, of an automatic temperature responsive controller for said circulating means located adjacent said cooling unit and a second automatic temperature responsive controller for the circulating means disposed at a distance from the cooling unit and connected in series relation with the first automatic controller and with said circulating means to require joint operation of both automatic controllers to start said circulating means and enable either automatic controller to stop said circulating means independently of the other.

4. The combination with a refrigerant system including a cooling unit and means for circulating a refrigerant through said cooling unit, of an automatic temperature responsive controller for said motor located adjacent said cooling unit and a second automatic temperature responsive controller for the motor disposed at a distance from the cooling unit and connected in series relation with the first automatic controller and with said circulating means to require joint operation of both automatic controllers to start said circulating means and enable either automatic controller to stop said circulating means independently of the other and controlling means independent of both automatic controllers arbitrarily operable to deprive one of the automatic controllers of its controlling power and to place automatic control of the circulating means solely in the power of the other automatic controller.

5. In refrigerating apparatus of the character disclosed, the combination with a refrigerator, a cooling unit in said refrigerator, means for circulating a refrigerant through said cooling unit, means for automatically controlling starting of said circulating means located in the refrigerator adjacent the cooling unit and a second automatic controller for starting operation of said circulating means located in the refrigerator at a point removed from the first automatic controller but connected in series relation with said first automatic controller to require joint operation of said remotely related automatic controllers to initiate circulation of the refrigerant and enable each controller to interrupt circulation of the refrigerant independently of the other automatic controller, said automatic controllers being responsive to temperature conditions at such remotely related points.

6. In refrigerating apparatus of the character disclosed, the combination with a refrigerator, a cooling unit in said refrigerator, means for circulating a refrigerant through said cooling unit, means for automatically controlling starting of said circulating means located in the refrigerator adjacent the cooling unit and a second automatic controller for starting operation of said circulating means located in the refrigerator at a point removed from the first automatic controller but connected in series relation with said first automatic controller to require joint operation of said remotely related automatic controllers to initiate circulation of the refrigerant and enable each controller to interrupt circulation of the refrigerant independently of the other automatic controller, said automatic controllers being responsive to temperature conditions at such remotely related points and means outside the refrigerator for arbitrarily depriving one of the automatic controllers of its controlling power.

7. In refrigeration apparatus of the character disclosed, a refrigerator having a cooling space in communication with a storage space, a cooling unit in the cooling space, means for circulating a refrigerant through said unit, automatic temperature responsive devices for controlling the refrigerant circulating action located in the cooling and the storage spaces respectively of the refrigerator and connected in series relation with each other to require the joint operation of both said automatic devices to initiate circulating action of the refrigerant and enabling either of said automatic devices to interrupt circulating action of the refrigerant independently of the other.

8. In refrigeration apparatus of the character disclosed, a refrigerator having communicating cooling and storage compartments, an expansion receptacle in the cooling compartment, a condenser and a compressor connected with said expansion receptacle, a motor for operating the compressor, an automatic temperature responsive controller for the motor located in one of the refrigerator compartments and a second automatic temperature responsive controller for the motor located in the other refrigerator compartment and connected in series relation with the first automatic controller and with the motor and whereby the operation of said motor is dependent upon the co-operative action of said remotely related independently acting thermally affected automatic controllers.

9. In refrigeration apparatus of the character disclosed, a refrigerator having a cooling space in communication with a storage space, a cooling unit in the cooling space, means for circulating a refrigerant through said unit, automatic temperature responsive devices for controlling the refrigerant circulating action located in the cooling and the storage spaces respectively of the refrigerator and connected in series relation with each other to require the joint operation of both said automatic devices to initiate circulating action of the refrigerant and enabling either of said automatic devices to interrupt circulating action of the refrigerant independently of the other, the automatic controller at the storage space being constructed and arranged for the maintenance of storage temperature in such space, the automatic controller at the cooling space being constructed and arranged for the maintenance of a freezing temperature in the cooling space and control means for depriving the storage compartment automatic control of its controlling power to thereby leave the control of the circulating action of refrigerant under the automatic control of the cooling space controller.

In witness whereof, I have hereunto set my hand this 17th day of December, 1924.

HERVEY S. VASSAR.